United States Patent Office 3,350,371
Patented Oct. 31, 1967

3,350,371
PROCESS FOR THE PRODUCTION OF STYRENE-BUTADIENE RUBBER IN PRESENCE OF COAGULATING SYSTEM
Donald Santmyers, Houston, Tex., assignor to E. I. du Pont de Nemours and Company, Wilmington, Del., a corporation of Delaware
No Drawing. Filed May 28, 1963, Ser. No. 283,715
4 Claims. (Cl. 260—85.1)

This invention is directed to the manufacture of styrene-butadiene rubber and more particularly is directed to an improved coagulating aid used in styrene-butadiene synthetic rubber manufacture.

Even more specifically the present invention is directed to new compositions comprising aqueous solutions of aliphatic polyamine sulfamate salts which are useful coagulating aids in the production of styrene-butadiene rubber and to processes for their preparation.

In the manufacture of styrene-butadiene rubber, coagulants are used to form a crum of coagulated particles of styrene-butadiene. Conventionally, sulfuric acid or aluminum sulfate are employed as styrene-butadiene coagulants. It is found, however, that such coagulants alone are not entirely sufficient for producing the crum as many of the fine particles of styrene-butadiene remain in the reactant solution. As such, in the production of styrene-butadiene rubber, considerable quantities of the product are wasted.

It is desirable, therefore, that coagulating aids be used to agglomerate all the fine particles of styrene-butadiene into the crum.

Aliphatic polyamines have been found to be suitable coagulating aids but have been accepted by the styrene-butadiene rubber industry only with reluctance because the crum produced through their use is generally found to be sticky, and very difficult to dry and handle.

The sticky styrene-butadiene crum produced by aliphatic polyamine coagulating aids used in the past present drying problems and require increased maintenance of processing equipment. The crum produced is relatively dense and requires excessive drying periods. Since the production of styrene-butadiene rubber is a continuous process, longer periods of time required to dry the crum product slow down the rate of rubber production. Also, since the crum is sticky, the styrene-butadiene rubber manufacturing process must be too frequently interrupted to clean the equipment. Cleaning of the equipment is in itself a more difficult task than is required when no coagulating aids are used or even when others such as animal glue are used.

The rate at which styrene-butadiene rubber is manufactured is generally dependent upon the rated capacity of the driers used to dry the crum that is produced. However, the condition of the crum itself, that is to say, whether it is sticky and dense or whether it is relatively dry and fluffy, influences the rate of production inasmuch as the rated capacity of the driers used will be accordingly decreased or increased. If using a coagulating aid which produces a sticky dense crum that will not give up water at a rapid rate in the drier, a drier having a rated capacity of 7,500 pounds of styrene-butadiene rubber production per hour frequently will have to slow down to about 6,000 or even 5,000 pounds per hour. In addition the sticky crum produced by coagulating aids used in the past will hang up in the drier, necessitating frequent shutdowns for cleaning. To reduce the requirement for shutdowns the operators in producing styrene-butadiene rubber have chosen to operate at reduced rates rather than run the risk of too frequent shutdowns.

There is as yet no technically satisfactory explanation why aliphatic polyamines serve as coagulating aids in styrene-butadiene rubber manufacture. However, irrespective of the mechanism involved, I have found that aliphatic polyamines reacted with sulfamic acid to produce aqueous solutions of polyamine sulfamate salts provide an improved coagulating aid in the manufacture of styrene-butadiene synthetic rubber. The crum produced by using polyamine sulfamates in accordance with the present invention are fluffier, and more easily dried and handled than the crum produced by coagulating aids used in the past. As such, the driers used to drive water out of the crum can be operated at full or above rated capacity. It is also found that the driers remain clean for extended periods of time requiring less frequent shutdowns for cleaning operations.

In accordance with the present invention an aqueous solution of aliphatic polyamines is titrated with sulfamic acid to form an aqueous solution of polyamine sulfamate salts. The polyamine sulfamate salt solution is then metered at a predetermined rate into the reactants for forming styrene-butadiene rubber.

To form the aqueous solution of polyamines, there can be used as a starting material the aliphatic polyamines remaining as the still heel of a distillation process for the recovery of amines. For example, in the recovery of hexamethylenediamine by distillation from a mixture of amines there will remain behind in the still bottom an undistilled by-product comprised essentially of a mixture of aliphatic polyamins. These are principally polyalkylene polyamines such as ethylene-diamine, propylene-diamine, diethylene-triamine, diamylene-triamine, triethylene-tetramine, tripropylene-tetramine, diethylenepropylene-tetramine, tetraethylene-pentamine, tetrabutylene-pentamine, butylene-diamine, dihexylene-triamine, trihexylene-tetramine, and the like, or mixtures thereof.

Suitable commercially available polyamine products of this type are a crude dihexylene triamine containing minor amounts of other polyalkylene polyamines which is marketed by E. I. du Pont de Nemours & Company under the trade name of "Amine 248" and a crude diethylene triamine containing minor amounts of ethylene diamine and triethylene tetramine marketed by Union Carbide Corporation under the trade name "Polyamine H."

As a starting material for forming an aqueous solution of polyamines there can also be used relatively pure aliphatic polyamines which have been obtained by further distillation of the still heel by-product. However, for practical reasons of economy and ease of handling it is preferred in the practice of the present invention to use the still heel product consisting of a mixture of aliphatic polyamines. It is observed that use of the relatively pure single aliphatic polyamine distillates offers no advantage over the mixture of polyamines obtained from the still heel of the distillation process and accordingly, no particular advantage is obtained by their use.

In general, other polyamine still heels resulting from distillation processes for recovery of amines can comprise mixtures of aliphatic polyamines of the general formula:

$$H_2N[(CH_2)_n—NH]_x—H$$

where:

$n$ is a positive whole number from 2 through 12; and
$x$ is a positive whole number from 1 through 20.

Thus polyamines suitable for practice of the present invention are those which are made of diamine monomers containing from 2 through 12 carbon atoms and which have from one through 20 monomers linked together in the polymer. They can be used in mixed forms or as relatively pure compounds. Some of the compounds present when in mixed form are often also cyclic imines. The polyamines present can be substituted with alkyl radicals of from one through four carbon atoms or with hydroxyl groups, ethanol groups, etc. There will generally also be present other impurities such as nitriles, carbamates, and the like, in trace amounts.

Irrespective of the exact structure of the polyamines present, it is found that when added to water and titrated with sulfamic acid to form polyamine sulfamate salts, they produce an excellent coagulating aid in the manufacture of styrene-butadiene rubber.

Preparation of the styrene-butadiene rubber coagulating aid of the present invention can be represented by the following equation:

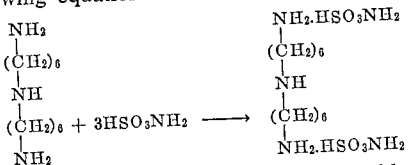

The polyamine represented above is di(1,6-hexylene) triamine, but such is only for the purpose of illustration. As above described, the polyamines existing in the still heel comprise a mixture of many polyamines. However, it is shown that analysis of the still heel resulting from the distillation of amines to obtain hexamethylenediamine can be represented hypothetically as the polyamine tri (1,6-hexylene)tetramine.

Similarly, the still heel resulting from the distillation of other amine raw products for the recovery of pure amines other than the hexamethylenediamine above described will contain mixtures of polyamines which can be represented hypothetically by other equations. For example, diethylene triamine is a representative polyamine for the mixture of polyamines resulting as a still heel from further distillation of an amine raw product. In this instance, the formation of the polyamine sulfamate salt is represented as follows:

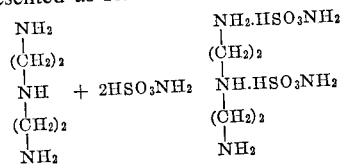

To prepare the coagulating aid of the present invention the still heel from the distillation of amines is dissolved in water to form a solution concentration ranging from 0.2 through 25% and preferably from 3% to 10%. This solution is then titrated with a 1 N solution of sulfamic acid to a potentiometric end point ranging from a pH of 8.0 through 11 and preferably from a pH of 8.5 through 9.5.

The resulting solution of polyamine sulfamate salts is then concentrated or diluted as desired for use as a coagulating aid in the manufacture of styrene-butadiene rubber. For such use, the polyamine sulfamate concentration by weight ranges from about 0.1% to fully saturated solutions and preferably from about 2% to 30% solids. Most preferably the polyamine sulfamate concentration by weight ranges from about 3% to 10%.

In using the polyamine sulfamates of the present invention as a coagulating aid in the manufacture of styrene-butadiene rubber, the solution of polyamine sulfamates is introduced into the synthetic rubber ingredients either together with or separate from sulfuric acid or aluminum sulfate coagulants. The polyamine sulfamate solution is thoroughly blended mechanically throughout the mix to speed up its coagulating effect.

Since the production of styrene-butadiene rubber is a continuous process, the coagulating aid of the present invention is introduced into the ingredients continuously. Depending upon the rate of production and the concentration of the polyamine sulfamate solution, the coagulating aid is introduced into the reactants at a rate ranging from about one-half gallon through five gallons per minute.

In general, the lower concentrations of polyamine sulfamate solutions are introduced at a more rapid rate while higher concentrations are introduced more slowly. Also, the more quickly the crum produced can be dried, the more rapidly the coagulating aid solution can be introduced.

In any event, based upon a styrene-butadiene rubber production rate of 7,500 lbs. per hour, a 3% polyamine sulfamate solution can be introduced into the synthetic rubber ingredients at a rate ranging from about 2 to 4 gallons per minute. Stated differently, for each ton of styrene-butadiene rubber produced, about 3 lbs. to 40 lbs. of polyamine sulfamate solids are introduced into the ingredients.

The present invention, while not limited thereto will be better understood and practiced by reference to the following specific examples.

*Example I*

To a three gram sample of "Amine 248," a mixture of aliphatic polyamines which is obtained as a still heel from the selective distillation of amine raw products for the recovery of pure hexamethylenediamine, 97 ml. of water are added to yield a 3% solution.

A 1 N sulfamic acid solution is prepared by dissolving 97.1 grams of sulfamic acid in water to a final volume of 1 liter.

The 3% polyamine solution is then titrated with the 1 N sulfamic acid solution to a potentiometric end point (pH 8.5). This neutralization requires 22.6 milliequivalents (2.188 grams) of sulfamic acid.

A working quantity of polyamine sulfamate solution is then prepared by dissolving 400 pounds of the same mixture of polyamines used in the above sample in 2,650 gallons of water with agitation. To this solution is added 292 pounds of sulfamic acid with continued agitation for 5 minutes to complete solution and the resultant polyamine sulfamate solution is then ready for use as a coagulating aid in the production of styrene-butadiene rubber.

*Example II*

A 10% aqueous solution of polyamines is prepared by dissolving 10 grams of "Polyamine H," a crude polyamine mixture comprised essentially of diethylene triamines and minor amounts of ethylene diamine and triethylene tetraamine in 90 ml. of water. This solution is then titrated with a 1 N sulfamic acid solution to a potentiometric end point (pH 10.5). This neutralization requires 3.3 milliequivalents (0.323 grams) of sulfamic acid resulting in a 13% polyamine sulfamate solution.

*Example III*

A saturated solution of polyamine sulfamate is prepared by adding 12 grams of "Amine 248" and 10 grams of sulfamic acid to 50 ml. of water. Complete solution is obtained.

*Example IV*

A 0.7% solution of polyamine sulfamate salts is prepared by dissolving 0.4 grams of "polyamine H" and 0.3 grams of sulfamic acid in 99.3 ml. of water. The resulting polyamine sulfamate solution has a pH of 8.1.

*Example V*

Three percent solutions of polyamines are prepared as in Example I except that for "Amine 248" there is substituted in each solution equal amounts of the following aliphatic polyamines:

(a) ethylene diamine
(b) triethylene tetramine
(c) tripropylene tetramine
(d) propylene diamine
(e) tetrabutylene-pentamine
(f) diethylenepropylene-tetramine
(g) butylene diamine
(h) trioctylene-tetramine
(i) octadecalene-nonamine
(j) tridodecylene-tetramine
(k) cosadoceylene-uncosamine Each of the above solutions is titrated with 1 N sulfamic acid solutions to a potentiometric end point pH 8.5 and are suitable for use as a coagulating aid in the manufacture of styrene-butadiene rubber as exemplified in the examples given hereinafter.

*Example VI*

A working quantity of 2.8% polyamine sulfamate solution prepared as in Example I is fed through a rotameter at the rate of 2.5 gallons per minute to a serum of styrene-butadiene rubber flowing at a rate of 120 pounds of solids per minute.

The rate of styrene-butadiene rubber production is increased from 5,000 pounds per hour to 7,500 pounds per hour through the same drying equipment when using this coagulating aid compared to production of styrene-butadiene rubber with polyamines by themselves as the coagulating aid.

The styrene-butadiene crum is fluffy and exihibits no tendency to stick-up in the driers where it is rapidly dried and removed.

*Example VII*

Results similar to those set forth in the preceding example occur when 2.8% solutions of each of the polyamine sulfamate salts prepared as in Example V are substituted for the "Amine 248" sulfamate salt.

*Example VIII*

A concentrated solution of polyamine sulfamates is prepared in the proportions of Example III and is fed continuously with mechanical blending at the rate of 0.28 gallons per minute to a stream of styrene-butadiene reactants flowing at the rate of 124 pounds of solids per minute.

This rate of introduction of polyamine sulfamates is equivalent to 14 pounds of polyamine sulfamate solids per ton of styrene-butadiene rubber and is similarly accomplished by diluting the concentrated solution to a concentration of 18% and adding it to the same styrene-butadiene stream at the rate of 4.8 gallons per minute.

The rate of styrene butadiene rubber production is increased from 5,000 pounds per hour to about 8,000 pounds per hour and the crum is fluffier, less sticky and more easily dried than is the crum produced with polyamine by themselves as a coagulating aid.

*Example IX*

Polyamine sulfamate solutions are prepared in the proportions of Example II and IV. Each is then fed into two separate styrene-butadiene reactant streams at the rate of six pounds of polyamine sulfamate solids per ton of styrene-butadiene rubber being produced.

An increase in the production of styrene-butadiene rubber similar in magnitude to that of Example VI is obtained by each addition of the above polyamine sulfamate solutions at the rates specified.

*Example X*

A concentrated solution of polyamine sulfamates is prepared in the proportions of Example III and is fed continuously with mechanical blending at the rate of 0.8 gallons per minute to a stream of styrene-butadiene reactants flowing at the rate of 124 pounds of solids per minute.

This rate of introduction of polyamine sulfamates is equivalent to 40 pounds of polyamine sulfamate solids per ton of styrene-butadiene rubber.

The rate of styrene-butadiene rubber production is increased from 5,000 pounds per hour to about 8,750 pounds per hour and the crum is fluffier, less sticky and more easily dried than is the crumb produced with polyamines by themselves as a coagulating aid.

What is claimed is:

1. In a process for producing styrene-butadiene rubber, the improvement comprising introducing into the reactants for forming styrene-butadiene rubber a coagulant and an aqueous solution of aliphatic polyamine sulfamate at a rate equivalent to the introduction of from about 3 to about 40 pounds of polyamine sulfamate solids per ton of styrene-butadiene rubber produced, said aqueous solution being a .1% to fully saturated solution of the reaction product of an aliphatic polyamine of the general formula $$H_2N-[(CH_2)_n-NH]_x-H$$

wherein $n$ is a positive whole number from 2 through 12; and
$x$ is a positive whole number from 1 through 20, with an amount of sulfamic acid sufficient to reach a potentiometric end point pH ranging from about 8 through 11.

2. The process of claim 1 wherein the aqueous solution of aliphatic polyamine sulfamate has a solids content ranging from 3% through 10% by weight.

3. The process of claim 1 wherein the amount of sulfamic acid added is sufficient to reach a potentiometric end point pH of 8.5 through 9.5.

4. The process of claim 1 wherein the reaction product is selected from the group consisting of the sulfamates of ethylene-diamine, propylene-diamine, diethylene-triamine, diamylene-triamine, triethylene-tetramine, tripropylene-tetramine, diethylenepropylene-tetramine, tetraethylene-pentamine, tetrabutylene-pentamine, butylene-diamine, dihexylene-triamine, trihexylene-tetramine, trioctylene-tetramine, octadecalene-nonamine, tridodecylene-tetramine, cosadodecylene-uncosamine and mixtures thereof.

References Cited

UNITED STATES PATENTS

| | | | |
|---|---|---|---|
| 2,900,294 | 8/1959 | Skaptason et al. | 260—584 |
| 3,112,288 | 11/1963 | Davis et al. | 260—85.1 |
| 3,148,225 | 9/1964 | Albert | 260—94.7 |

J. A. SEIDLECK, *Primary Examiner.*

JOSEPH L. SCHOFER, *Examiner.*

W. HOOVER, *Assistant Examiner.*